(12) United States Patent
Dou et al.

(10) Patent No.: US 9,378,052 B1
(45) Date of Patent: Jun. 28, 2016

(54) GRANTING RANGELOCKS ACCORDING TO THREAD ARRIVAL TIME

(71) Applicant: EMC Corporation, Hopkinton, MA (US)

(72) Inventors: Ruiling Dou, Shanghai (CN); Feng Zhang, Shanghai (CN); Ying Hu, Northborough, MA (US); Gong Chen, Beijing (CN); Hao Pan, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/674,450

(22) Filed: Mar. 31, 2015

(51) Int. Cl.
*G06F 9/46* (2006.01)
*G06F 9/48* (2006.01)
*G06F 9/52* (2006.01)

(52) U.S. Cl.
CPC .............. *G06F 9/4825* (2013.01); *G06F 9/524* (2013.01)

(58) Field of Classification Search
None
See application file for complete search history.

(56) References Cited

U.S. PATENT DOCUMENTS

| 6,658,522 | B1 * | 12/2003 | Martin | G06F 12/126 710/6 |
| 2002/0138544 | A1 * | 9/2002 | Long | G06F 9/52 718/107 |

* cited by examiner

*Primary Examiner* — Sisley Kim
(74) *Attorney, Agent, or Firm* — BainwoodHuang

(57) ABSTRACT

Improved techniques of implementing range lock involve granting a sleeping thread access to an address range when no conflicts exist with earlier pending requests as well as with already granted requests. Along these lines, a current child thread that has a conflict with a parent thread that currently holds a range lock on a range of bytes during a read/write operation will be awoken from waiting state when the parent thread has completed its access and releases its lock. In response, the processor compares the range to which the current child thread request access with the ranges to which other sleeping threads request access. However, the comparisons are only performed in connection with (i) requests that arrived prior to the current child thread and (ii) other granted requests.

15 Claims, 5 Drawing Sheets

US 9,378,052 B1

GRANTING RANGELOCKS ACCORDING TO THREAD ARRIVAL TIME

BACKGROUND

Many data storage systems are arrangements of hardware and software that include storage processors coupled to lists of non-volatile storage devices. In typical operation, storage processors service storage requests that arrive from client machines. The storage requests specify data objects (e.g., file systems, LUNs, vVols, and the like) to be accessed, overwritten, created, or deleted, for example. The storage processors run software that manages incoming storage requests and performs various data processing tasks to organize and secure the data stored on the non-volatile storage devices.

Storage systems are designed to guarantee data consistency stored on it. Data consistency means, given a set of storage requests, there exists a sequence, that the final data stored on disk can be determined by replaying the storage requests one after one in that sequence.

Frequently, storage requests originate with applications running on the client machines. Such applications typically launch multiple threads to write and read data from various locations on disk. However, some threads may try to write to certain addresses at the same time; such concurrent access may violate data consistency at those addresses on disk.

In order to guarantee such data consistency, some data storage systems provide range locks. A rangelock protects reads and writes which overlap in a range of data area. For example, when a thread is writing to a range, other threads requesting writes or reads to any byte in that range will be put to sleep until the lock is lifted; When a thread is reading from a range, other threads requesting writes to any byte in that range will be put to sleep until the lock is lifted while other threads requesting reads can still get served. This guarantees that data on disk is always in a consistent state under concurrent read and write requests.

Conventional approaches to implementing rangelock include implementations of non-greedy processes. In a non-greedy process, a thread is granted access to a range of data, when there are no other conflicting process waiting to access any byte of that area.

SUMMARY

Unfortunately, the above-described conventional approaches of range lock may cause long peak I/O latencies. In severe cases in which there are hundreds of such conflicting range requests, such latencies may be noticeable to the user.

In contrast with the above-described conventional approaches to implementing range lock, improved techniques of implementing range lock involve granting a sleeping thread access to an address range when no conflicts exist with earlier pending requests as well as with already granted requests. Along these lines, a current child thread that has a conflict with a parent thread that currently holds a range lock on a range of bytes during a read/write operation will be awoken from waiting state when the parent thread has completed its access and releases its lock. In response, the processor compares the range to which the current child thread request access with the ranges to which other sleeping threads request access. However, the comparisons are only performed in connection with (i) requests that arrived prior to the current child thread and (ii) other granted requests. If the comparison produces no addresses in common, then the storage processor grants the range lock to the current child thread, and the current child thread is activated. However, if the comparison result does produce an address in common, then the current child thread is put back in the waiting state and is made a child of another request which is already granted or pending and associated with a sleeping thread. Advantageously, the improved techniques decrease the number of comparisons before granting access to a thread and accordingly reduce peak I/O latency.

One embodiment of the improved techniques is directed to a method of operating a data storage system in which parent threads have been granted locks on respective address ranges in a storage device of the data storage system, and in which sleeping threads are in a waiting state until being granted locks on respective address ranges in the storage device. The method includes receiving, by a storage processor of the data storage system, a message that a lock on a first address range in the storage device granted to a first thread has been released. The method also includes, in response to the message, awakening a sleeping thread, the sleeping thread seeking a lock on a second address range in the storage device, the second address range and the first address range having at least one address in common. The method further includes comparing, to produce a comparison result, the second address range with (i) address ranges that are currently locked and (ii) address ranges to which respective locks are sought by an older subset of the set of sleeping threads, each thread of the older subset having been received prior to the second thread. The method further includes granting the sleeping thread the lock to the second address range in response to the comparison result indicating that the second address range has no addresses in common with either (i) or (ii). The method further includes placing the sleeping thread back into the waiting state in response to the comparison result indicating that the second address range has at least one address in common with (i) or (ii).

Additionally, some embodiments are directed to a data storage system. The data storage system includes a storage device and a storage processor, the storage processor including memory and controlling circuitry. The controlling circuitry is constructed and arranged to carry out a method of operating a data storage system in which parent threads have been granted exclusive access to respective address ranges in a storage device of the data storage system, and in which sleeping threads are in a waiting state until being granted exclusive access to respective address ranges in the storage device.

Further, some embodiments are directed to a computer program product having a non-transitory, computer-readable storage medium which stores executable code, which when executed by a computer, causes the computer to perform a method of operating a data storage system in which parent threads have been granted exclusive access to respective address ranges in a storage device of the data storage system, and in which sleeping threads are in a waiting state until being granted exclusive access to respective address ranges in the storage device.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Figure 1A:
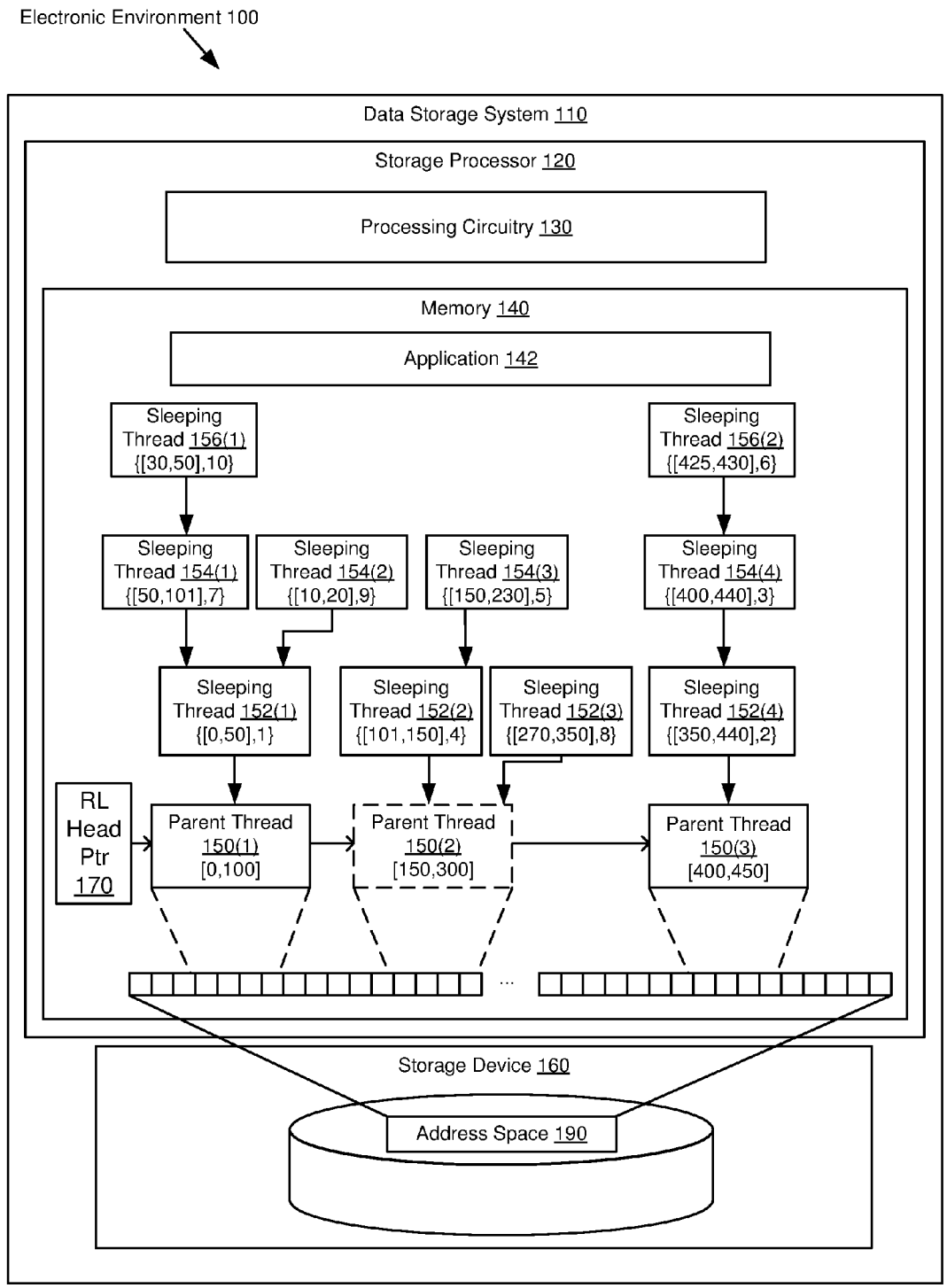
FIG. 1A is a block diagram illustrating an example electronic environment in which the improved technique can be carried out.

Improved techniques of implementing rangelocks involve granting a sleeping thread exclusive access to an address range when no conflicts exist with other sleeping threads that were received by the storage processor before the sleeping thread as well as threads having locks. Advantageously, the improved techniques improve peak I/O latency.

FIG. 1 shows an example electronic environment 100 including a data storage system 110 in which embodiments of the improved techniques hereof can be practiced. Data storage system 110 includes a storage processor 120, which in turn includes one or more processors 130 and memory 140, and non-volatile storage 160.

The processor 130 may include a CPU containing multiple cores. The processor 130 and the memory 140 together form controlling circuitry that is constructed and arranged to carry out the various methods and functions as described herein. The processor 130 is also configured to schedule threads that provide instructions to carry out various read and write operations.

The processor 130 stores data within the non-volatile storage 160 at addresses within an address range 190. For example, a byte of data may be located at a byte address. Alternatively, 8 kilobytes (kB) of data may be arranged in a data block at a block address. The amount of storage provided by the non-volatile storage 160 determines the span of the address range 190.

The memory 140 may include both volatile memory (e.g., RAM) and no-volatile memory (e.g., one or more flash drives and/or disk drives). The memory 140 is configured to store various software constructs containing executable code that, when executed by the processor 130, causes the processor 130 to perform various operations. As illustrated in FIG. 1A, the memory 140 stores an application 142, which contains instructions for reading and writing data to the non-volatile storage 160.

The memory 140 also stores threads containing instructions provided by the application 142 and scheduled by the processor 130 according to the improved techniques described herein. In the example shown in FIG. 1A, the memory 140 stores parent threads 150(1), 150(2), and 150(3) in a rangelock data structure list 170 at a location in memory 140 indicated by a rangelock head pointer. Each element of this list is a parent thread 150(1), 150(2), or 150(3) that performs a read or write operation on data stored in the non-volatile storage 160. Each of the parent threads 150(1), 150(2), and 150(3) has been granted a lock on a respective range of addresses within the address range 190. For instance, parent thread 150(1) has a lock on the address range [0,100], parent thread 150(2) has a lock on the address range [150, 300], and parent thread 150(3) has a lock on the address range [400,450].

Because these threads have locks on their respective ranges, no thread may perform an operation on any data located within their respective ranges. Accordingly, the processor 130 puts to sleep child threads that seek to lock ranges that have even one address in common with a range of a parent thread. These sleeping threads are stored in memory 140 in a waiting state until the parent threads with which the children threads have conflicts release their respective locks. In the example illustrated in FIG. 1A, sleeping thread 152(1) is a child of parent thread 150(1). It should be understood that sleeping thread 152(1) is denoted as seeking to lock the range [0,50], which conflicts with the range [0,100] locked by parent thread 150(1). Sleeping thread 152(1) cannot be awoken at least until its parent thread 150(1) releases its lock on the range [0,100].

FIG. 1A also illustrates sleeping child threads of the other parent threads 150(2) and 150(3). For example, parent thread 150(2) has a lock on address range [150,300]. Its sleeping child threads 152(2) and 152(3) have lock requests on respective ranges [101,150] and [270,350], each of which have at least one address in common with [150,300]. Parent thread 150(3) has a lock on range [400,450], and its sleeping child thread 152(4) has a lock request for the range [350,440].

Each of the sleeping child threads 152 in turn have their own sleeping child threads 154 that have lock requests on ranges that conflict with the ranges for their respective sleeping parents 152. Thus, there is a hierarchy of threads according to address range conflicts. This hierarchy arises from a conflict check performed for each range requested by a thread upon receipt by the data storage system. For example, the processor 130 first checks the parent threads 150 for a conflict. If there is a conflict with one of the parent threads, then the processor 130 checks for a conflict at each level in the hierarchy of sleeping child threads stemming from that parent thread. In FIG. 1, only three hierarchal levels are shown, but it should be understood that as many or few hierarchal levels may exist in the memory 130, limited by available memory.

It should be understood that each sleeping child thread 152, 154, 156 is in a waiting state within an operating system running on processor 130. Such waiting states are realized by semaphores within the operating system.

Further, as illustrated in FIG. 1A, the processor 130 arranges each child sleeping thread according to when that child sleeping thread was received by the data storage system 110. For example, sleeping child thread 152(1) is denoted with a "1" to indicate that this thread is the oldest thread in the waiting state within memory 140. Accordingly, sleeping child thread 152(2) is the fourth-oldest thread, sleeping child 152(3) is the eighth-oldest thread, and sleeping child 152(4) is the second-oldest thread. Other sleeping threads 154 are similarly labeled according to their relative age in the memory 140.

It should be understood that the numerals accompanying each sleeping thread illustration in FIG. 1A are there for instructive purposes and, in the example described here, are not part of an actual memory object.

Figure 1B:
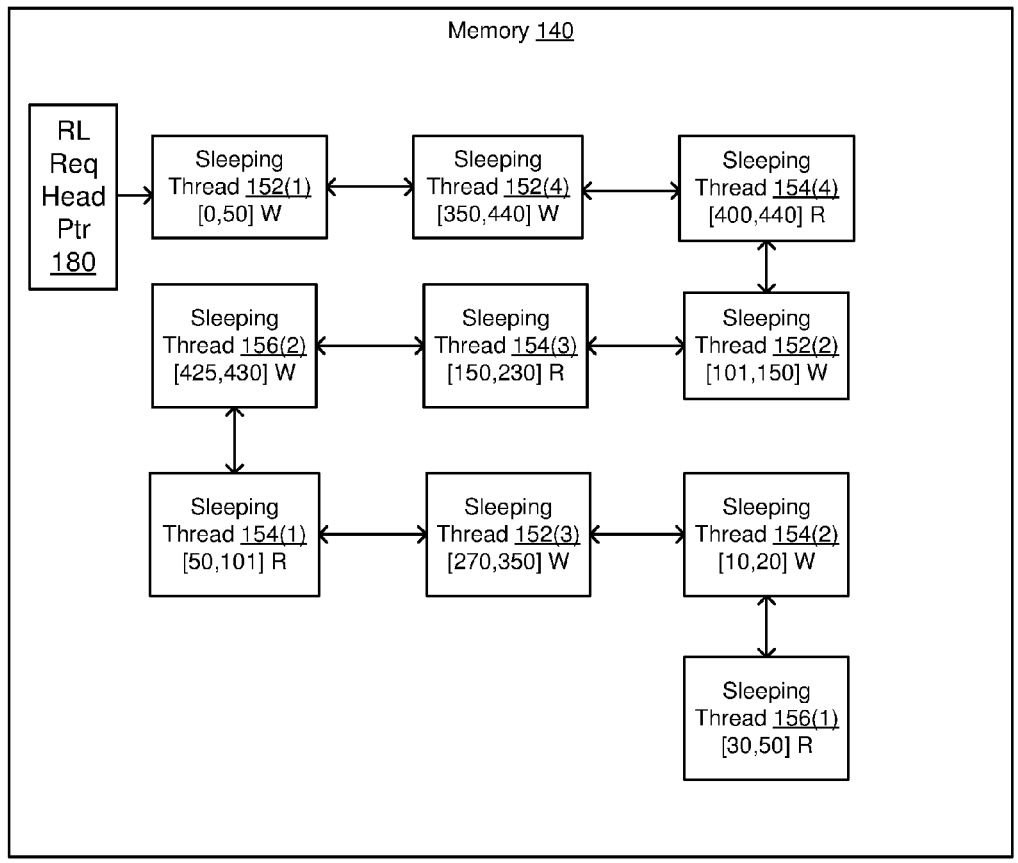
FIG. 1B is a block diagram illustrating an example server memory arrangement within the electronic environment illustrated in FIG. 1.

FIG. 1B illustrates a requesting data structure list 180 whose location in memory 140 is indicated by a rangelock request head pointer. Each element of this list 180 is included in a respective child thread data structure that identifies and describes the thread requesting a rangelock and the address range to be locked. Further, an element's position in the requesting data structure list 180 indicates the age of the thread identified by the structure in that element. For example, because sleeping child thread 152(1) is the oldest thread in memory 140, the first position in the list 180 identifies sleeping child thread 152(1). Sleeping child thread 152(4) is the second-oldest thread and thus includes the second position in the list.

It should be understood that the list 180 is realized in memory 140 as a doubly-linked list. Accordingly, each element of the list contains a previous pointer pointing to the element that comes before it and a next pointer pointing to the element that comes after it. Thus, the age of a thread is determined by the position of its data structure in list 180.

Each child thread data structure illustrated in FIG. 1B also carries a label of "W" or "R". The "W" designation indicates that the thread contains write instructions, while the "R" designation indicates that the thread contains read instructions. "R" and "W" label is used for conflict judgment when doing comparison with prior threads.

During operation, a parent thread 150(2) sends a signal, via processor 130, that the lock on the range [150,300] has been released. For example, the processor 130 may have completed execution of the instructions contained in parent thread 150(2). In the example discussed here, such a signal takes the form of a semaphore controlling access to that range taking on a positive value.

In response to the signal, the processor 130 reads the respective ranges requested for sleeping child threads 152(2) and 152(3), which conflicted with the range locked by parent thread 150(2). If there were no sibling threads, e.g., parent threads 150(1) and 150(3), then the processor 130 could grant to these child threads 152(2) and 152(3) their respective requested locks so long as these requests do not conflict (which in this example they do not). However, because there are sibling threads, the processor must complete a conflict check before such a grant.

To perform the conflict check for each child thread 152(2) and 152(3), the processor 130 first compares the range requested by that child to the range requested by each sleeping child thread that comes before that child thread in the requesting data structure list 180. For example, child thread 152(2) is seen to occupy the fourth element of list 180 from the head pointer. In this case, the processor 130 locates the thread data structure at a location in memory 140 indicated by the previous pointer of the fourth element of list 180. This previous pointer points to the sleeping child thread 154(4), which is the third-oldest thread whose data structure occupies the third element of list 180, and compares the range [101, 150] requested by child thread 152(2) to the range requested by sleeping child thread 154(4), which is [400,440]. As there is no conflict there, the processor locates the thread data structure at a location in memory 140 indicated by the previous pointer of the third element of list 180.

The process repeats until either a conflict is found (i.e., the ranges being compared have at least one address in common) or the processor locates the head pointer of list 180. For example, in the former case, the processor 130 puts the child thread 152(2) into a waiting state (e.g., by decrementing a semaphore) and becomes a sleeping child thread of the thread having the conflict. In the latter case, the processor 130 compares the range [101,150] requested by child thread 152(2) to the range locked by each parent thread 150(1) and 150(3).

Suppose that no conflict is found between the child thread and the older sleeping child threads. The processor 130 then determines if there is a conflict between the child thread and each parent thread. For example, if there is a conflict between child thread 152(2) and a parent thread, then the processor 130 puts the child thread 152(2) back into a waiting state so that child thread 152(2) becomes a sleeping child thread of that parent thread. However, if there is no conflict found, then the processor 130 may grant the child thread 152(2) its requested lock.

Figure 2:
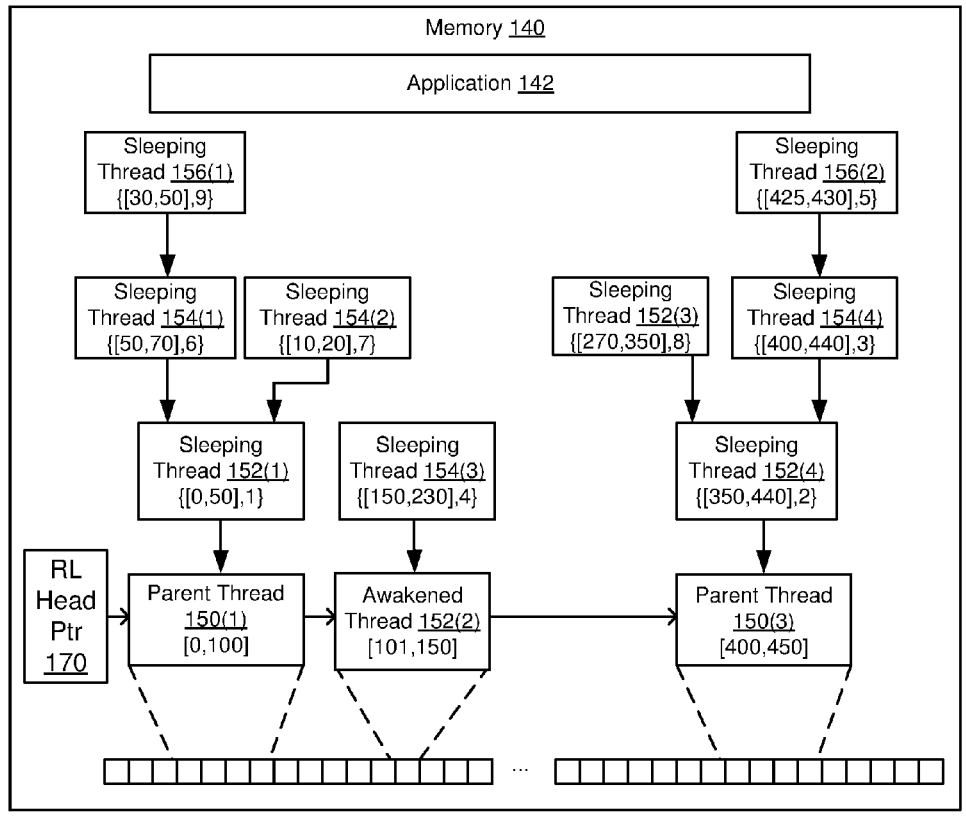
FIG. 2 is a block diagram illustrating an example outcome of a range lock being granted within the electronic environment illustrated in FIG. 1.

FIG. 2 illustrates the result of the above-described example process of managing rangelocks. In this case, the child thread 152(2) has no conflicts with any of the older sleeping threads 154(4), 152(4), and 152(1), or any of the parent threads 150(1) and 150(3). Accordingly, processor 130 awakens the child thread 152(2) and grants this awakened thread 152(2) its requested lock on range [101,150]. Newly awakened thread 152(2) has a sleeping child thread 154(3) that has requested a lock on range [150,230]. By granting the thread 152(2) its requested lock, the processor has promoted sleeping child thread 154(3) one level in the hierarchy.

In contrast, child thread 152(3) (requested range=[270, 350], position in list 180=8) has a conflict with an older sleeping child thread, which in the example discussed here is sleeping child thread 152(4) (requested range=[350,440], position in list 180=2). In this case, the processor places child thread 152(3) back in the waiting state and makes now sleeping child thread 152(3) a child of sleeping child thread 152(4), i.e., the processor 130 has demoted child thread 152(3) one level in the hierarchy.

Figure 3:
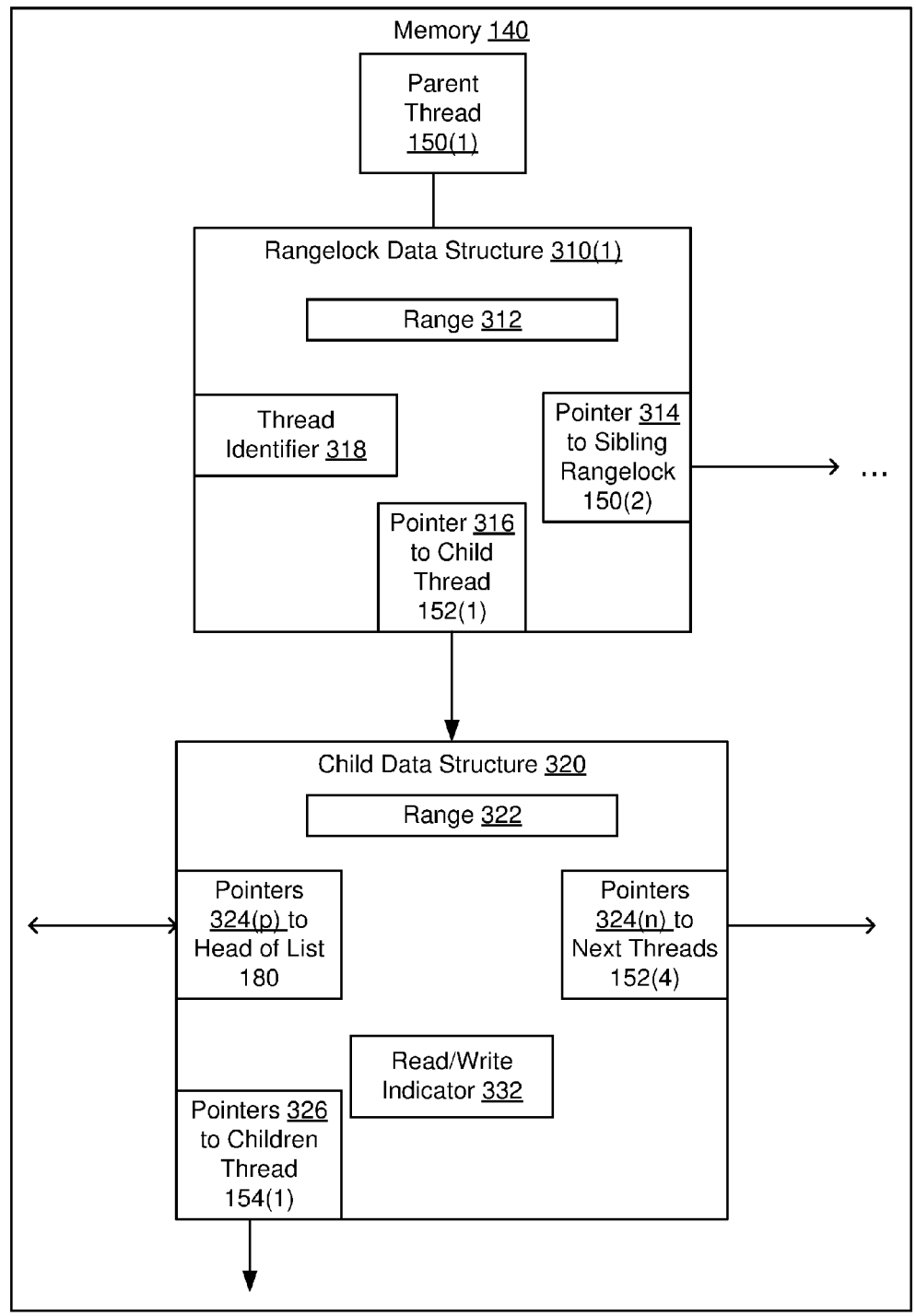
FIG. 3 is a block diagram illustrating an example rangelock data structure and child thread data structure within the electronic environment illustrated in FIG. 1.

FIG. 3 illustrates further detail of the data structures in lists 170 and 180, respectively. As discussed above in connection with FIG. 1A, each element of list 170 contains a rangelock data structure and each element of list 180 contains a child thread data structure. Such data structures make it possible for the processor 130 to identify the various ranges, ages, instruction types, children, and siblings with a given thread so that the above-described processes may be carried out.

As illustrated in FIG. 3, parent thread 150(1) is identified by rangelock data structure 310(1). Other parent threads are identified by similar rangelock data structures. Each rangelock data structure, e.g., rangelock data structure 310(1), includes a range 312 locked by the processor 130 for its identified thread, a pointer 314 to a sibling rangelock data structure, a pointer 316 to one or more children threads, and a thread identifier 318 identifying its thread. For example, for rangelock data structure 310(1) identifying thread 150(1), range 312 would indicate the range [0,100], pointer 314 would indicate a location in memory where a rangelock data structure identifying thread 150(2) is located, and pointer 316 would point to a child data structure identifying sleeping child thread 152(1).

As further illustrated in FIG. 3, child thread data structure 320, pointed to by a rangelock data structure 310, contains a range 322 for each child identified by the respective pointer 316. The child thread data structure 320 also contains pointers 326 to its sleeping child threads, e.g., for sleeping child thread 152(1), pointers to sleeping child threads 154(1) and 154(2). Further, the child thread data structure 320 contains a read/write indicator 332 that indicates whether the identified thread contains read or write instructions.

Figure 4:
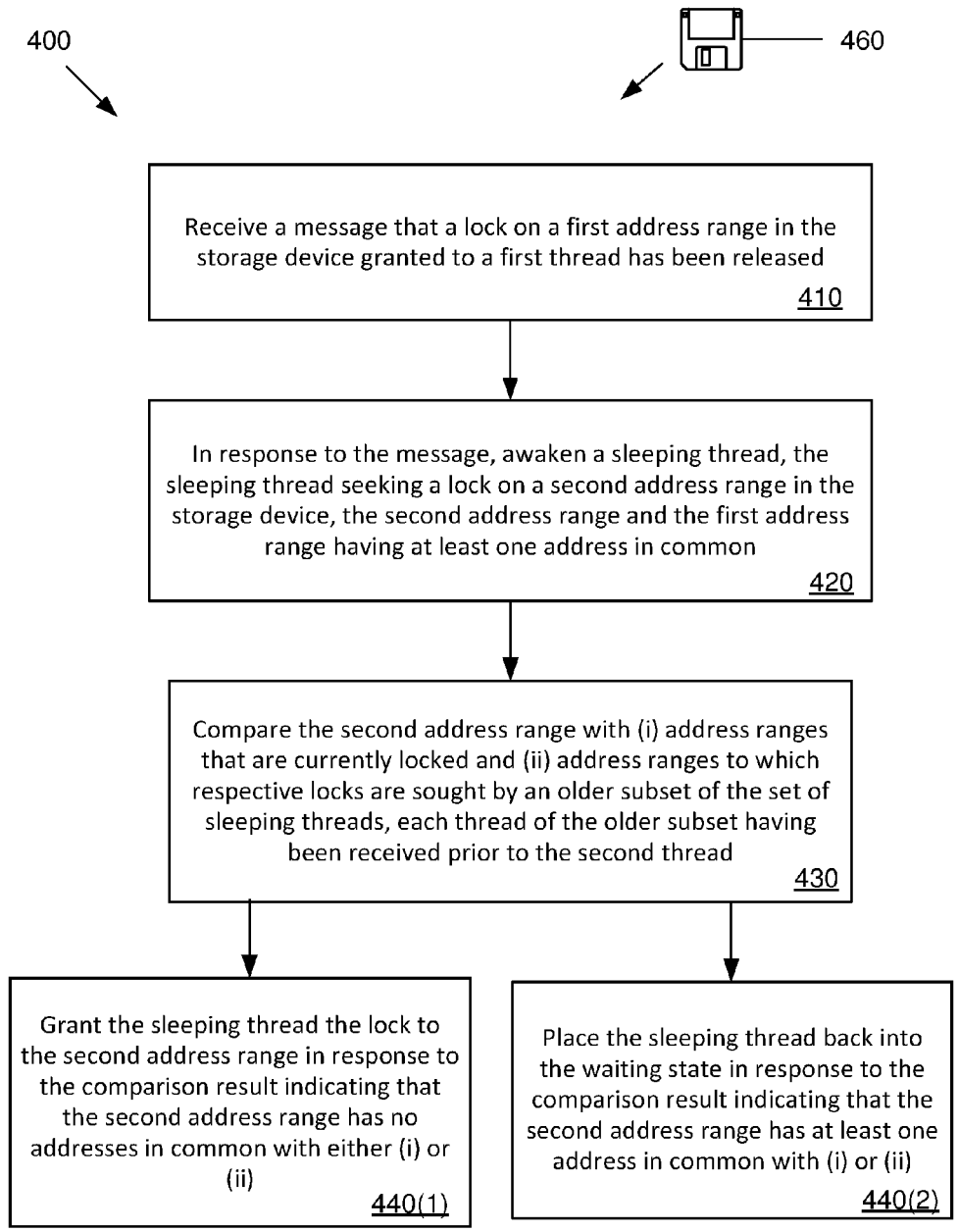
FIG. 4 is a flow chart illustrating an example method of carrying out the improved technique within the electronic environment illustrated in FIG. 1.

FIG. 4 illustrates a method 400 for carrying out the above-described improved techniques. The process 400 may be performed by the software constructs described in connection with FIGS. 1-3, which reside in the memory 140 of the storage processor 120 within data storage system 110. The various acts of the process 400 may be ordered in any suitable way. Accordingly, embodiments may be constructed in which acts are performed in orders different from those illustrated, which may include performing some acts simultaneously, even though the acts are shown as sequential in the illustrated embodiments.

At 410, the processor 130 receives a message that a lock on a first address range in the storage device granted to a first thread has been released. In the example described above, such a message is produced by a semaphore within the operating system running on the processor 130. Typically, when the parent thread releases a lock, the semaphore is incremented (e.g., via internal logic within or outside of the processor 130) above a threshold value (e.g., a nonnegative value). The operating system contains instructions that cause the processor to awaken the sleeping child thread or threads of that parent.

At 420, the processor awakens a sleeping thread in response to the message. The sleeping thread seeks, i.e., requests, a lock on a second address range in the storage device, the second address range and the first address range having at least one address in common. For example, parent thread 150(2) has a lock on a first address range [150,300], and sleeping child thread 152(2) has a lock request on second address range [101,150]. As these ranges have the address at byte or block 150 in common, these threads have a conflict. Thus, thread 152(2) is a sleeping child of parent thread 150(2).

At 430, the processor 130 compares the second address range with (i) address ranges that are currently locked (i.e., from the siblings 150(1) and 150(3) of the parent thread 150(2)) and (ii) address ranges to which respective locks are sought by an older subset of the set of sleeping threads (i.e., sleeping child threads 154(4), 152(4), and 152(1)). Each thread of the older subset has been received prior to the second thread.

At 440(1), the processor 130 grants the sleeping thread the lock to the second address range in response to the comparison result indicating that the second address range has no addresses in common with either (i) or (ii), i.e., address ranges that are currently locked or address ranges to which respective locks are sought by an older subset of the set of sleeping threads. This case is illustrated in FIG. 2 in connection with thread 152(2).

At 440(2), the processor 130 places the sleeping thread back into the waiting state in response to the comparison result indicating that the second address range has at least one address in common with (i) or (ii). This case is illustrated in FIG. 2 in connection with thread 152(3).

Improved techniques of implementing rangelocks involve granting a sleeping thread exclusive access to an address range when no conflicts exist with other sleeping threads that were received by the storage processor before the sleeping thread as well as threads having locks. Advantageously, the improved techniques improve peak I/O latency because no thread is placed in a waiting state for an excessively long time due to conflicts from other threads arriving afterward. The data structures described in connection with FIGS. 1B and 3 enable the data storage system 110 to take arrival time for each thread into account in deciding whether to perform a conflict check on a requested range. By ignoring conflicts on lock requests from subsequent threads, each thread may its instructions executed with a relatively low degree of latency compared with the conventional, non-greedy techniques.

Having described certain embodiments, numerous alternate embodiments or variations can be made. For example, in one alternative configuration, the processor 130 may traverse list 180 going forward in time rather than backward as discussed above. In this case, the processor 130 accesses the elements of the list 180 pointed to by respective next pointers rather than the previous pointers discussed above. The processor 130 traverses through the list 180 by repeatedly accessing the elements at locations indicated by successive next pointers until the element prior to the current child element is reached. Then the processor may access the thread identified at the first element in the list 180 and repeats the comparison operation with the child thread until either a conflict is found or the processor returns back to the element prior to the current child element of list 180, i.e., the element identifying the child thread.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate List (FPGA), and the like (shown by way of example as medium 460 in FIG. 4). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of operating a data storage system in which parent threads have been granted locks on respective address ranges in a storage device of the data storage system, and in which sleeping threads are in a waiting state until being granted locks on respective address ranges in the storage device, the method comprising:

receiving, by a storage processor of the data storage system, a message indicating that a lock on a first address range in the storage device granted to a first thread has been released;

in response to receiving the message, awakening a sleeping thread, the sleeping thread seeking a lock on a second address range in the storage device, the second address range and the first address range having at least one address in common;

comparing, to produce a comparison result, the second address range with (i) address ranges that are currently locked and (ii) address ranges to which respective locks are sought by an older subset of the set of sleeping threads, each thread of the older subset having been received prior to the second thread;

granting the sleeping thread the lock on the second address range in response to the comparison result indicating that the second address range has no addresses in common with either (i) or (ii); and placing the sleeping thread back into the waiting state in response to the comparison result indicating that the second address range has at least one address in common with (i) or (ii).

2. A method as in claim 1, further comprising, in response to a lock on the second address range being granted to the sleeping thread, performing an I/O operation on the second address range according to instructions contained in the sleeping thread.

3. A method as in claim 1, further comprising, in response to a parent thread being granted a lock on an address range, generating a rangelock data structure corresponding to the parent thread, the rangelock data structure including (i) a range of addresses in the storage device to which the parent thread has been granted a lock, (ii) a child thread identifier identifying a sleeping thread seeking, but not having been granted, a lock on a range of addresses that has at least one address in common with the range of addresses to which the lock has been granted, and (iii) a pointer to another rangelock data structure.

4. A method as in claim 3, further comprising generating an element of a doubly linked list of sleeping thread data structures, each sleeping thread data structure corresponding to a sleeping thread identified by the child thread identifier of the rangelock data structure of a parent thread, that sleeping thread data structure including (i) a range of addresses in the storage device on which the sleeping thread seeks a lock, (ii) a child thread identifier, (iii) a pointer to either a head pointer or a previous sleeping thread data structure corresponding to another sleeping thread that was received by the data storage system prior to the sleeping thread, and (iv) a pointer to the head pointer or a next sleeping thread data structure corresponding to another sleeping thread that was received by the data storage system after to the sleeping thread.

5. A method as in claim 4, wherein the sleeping thread data structure further includes an operation indicator indicating whether the sleeping thread to which the sleeping thread data structure corresponds provides instructions for a reading operation or a writing operation.

6. A data storage system in which parent threads have been granted locks on respective address ranges in a storage device of the data storage system, and in which sleeping threads are in a waiting state until being granted locks on respective address ranges in the storage device, the data storage system comprising:
a storage device; and
a storage processor including memory and controlling circuitry, the controlling circuitry being constructed and arranged to:
receive a message indicating that a lock on a first address range in the storage device granted to a first thread has been released;
in response to receiving the message, awaken a sleeping thread, the sleeping thread seeking a lock on a second address range in the storage device, the second address range and the first address range having at least one address in common;
compare, to produce a comparison result, the second address range with (i) address ranges that are currently locked and (ii) address ranges to which respective locks are sought by an older subset of the set of sleeping threads, each thread of the older subset having been received prior to the second thread;
grant the sleeping thread the lock on the second address range in response to the comparison result indicating that the second address range has no addresses in common with either (i) or (ii); and
place the sleeping thread back into the waiting state in response to the comparison result indicating that the second address range has at least one address in common with (i) or (ii).

7. A data storage system as in claim 6, wherein the controlling circuitry is further constructed and arranged to, in response to the lock on the second address range being granted to the second thread, perform an I/O operation on the second address range according to instructions contained in the second thread.

8. A data storage system as in claim 6, wherein the controlling circuitry is further constructed and arranged to, in response to a thread being granted exclusive access to an address range, in response to a parent thread being granted a lock on an address range, generating a rangelock data structure corresponding to the parent thread, the rangelock data structure including (i) a range of addresses in the storage device to which the parent thread has been granted a lock, (ii) a child thread identifier identifying a sleeping thread seeking, but not having been granted, a lock on a range of addresses that has at least one address in common with the range of addresses to which the lock has been granted, and (iii) a pointer to a sibling rangelock data structure.

9. A data storage system as in claim 6, wherein the controlling circuitry is further constructed and arranged to generate an element of a doubly linked list of sleeping thread data structures, each sleeping thread data structure corresponding to a sleeping thread identified by the child thread identifier of the rangelock data structure of a parent thread, that child thread data structure including (i) a range of addresses in the storage device on which the sleeping thread seeks a lock, (ii) a child thread identifier, (iii) a pointer to either a head pointer or a previous sleeping thread data structure corresponding to another sleeping thread that was received by the data storage system prior to the sleeping thread, and (iv) a pointer to either the head pointer or a next sleeping thread data structure corresponding to another sleeping thread that was received by the data storage system after to the sleeping thread.

10. A data storage system as in claim 8, wherein the sleeping thread data structure further includes an operation indicator indicating whether the sleeping thread to which the sleeping thread data structure corresponds provides instructions for a reading operation or a writing operation.

11. A computer program product comprising a non-transitory, computer-readable storage medium which stores executable code, which when executed by a data storage system, causes the data storage system to perform a method of operating a data storage system in which parent threads have been granted locks on respective address ranges in a storage device of the data storage system, and in which sleeping threads are in a waiting state until being granted locks on respective address ranges in the storage device, the method comprising:
receiving, by a storage processor of the data storage system, a message indicating that a lock on a first address range in the storage device granted to a first thread has been released;
in response to receiving the message, awakening a sleeping thread, the sleeping thread seeking a lock on a second address range in the storage device, the second address range and the first address range having at least one address in common;
comparing, to produce a comparison result, the second address range with (i) address ranges that are currently locked and (ii) address ranges to which respective locks are sought by an older subset of the set of sleeping threads, each thread of the older subset having been received prior to the second thread;

granting the sleeping thread the lock on the second address range in response to the comparison result indicating that the second address range has no addresses in common with either (i) or (ii); and placing the sleeping thread back into the waiting state in response to the comparison result indicating that the second address range has at least one address in common with (i) or (ii).

12. A computer program product as in claim 11, wherein the method further comprises, in response to the lock on the second address range being granted to the second thread, performing an I/O operation on the second address range according to instructions contained in the second thread.

13. A computer program product as in claim 11, further comprising, in response to a parent thread being granted a lock on an address range, generating a rangelock data structure corresponding to the parent thread, the rangelock data structure including (i) a range of addresses in the storage device to which the parent thread has been granted a lock, (ii) a child thread identifier identifying a sleeping thread seeking, but not having been granted, a lock on a range of addresses that has at least one address in common with the range of addresses to which the lock has been granted, and (iii) a pointer to a sibling rangelock data structure.

14. A computer program product as in claim 13, wherein the method further comprises generating an element of a doubly linked list of sleeping thread data structures, each sleeping thread data structure corresponding to a sleeping thread identified by the child thread identifier of the rangelock data structure of a parent thread, that child thread data structure including (i) a range of addresses in the storage device on which the sleeping thread seeks a lock, (ii) a child thread identifier, (iii) a pointer to either a head pointer or a previous sleeping thread data structure corresponding to another sleeping thread that was received by the data storage system prior to the sleeping thread, and (iv) a pointer to either the head pointer or a next sleeping thread data structure corresponding to another sleeping thread that was received by the data storage system after to the sleeping thread.

15. A computer program product as in claim 13, wherein the sleeping thread data structure further includes an operation indicator indicating whether the sleeping thread to which the sleeping thread data structure corresponds provides instructions for a reading operation or a writing operation.

* * * * *